(12) United States Patent
Fonbonne

(10) Patent No.: US 10,803,179 B2
(45) Date of Patent: Oct. 13, 2020

(54) METHOD AND SYSTEM FOR DETECTING THE VULNERABILITY OF AN ONBOARD DEVICE

(71) Applicant: COMMISSARIAT A L'ENERGIE ATOMIQUE ET AUX ENERGIES ALTERNATIVES, Paris (FR)

(72) Inventor: Jean-Christophe Fonbonne, Tullins (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 166 days.

(21) Appl. No.: 15/816,272

(22) Filed: Nov. 17, 2017

(65) Prior Publication Data

US 2018/0144141 A1    May 24, 2018

(30) Foreign Application Priority Data

Nov. 21, 2016   (FR) ..................... 16 61298

(51) Int. Cl.
*G06F 21/57*    (2013.01)
*G06N 20/00*    (2019.01)
*G06F 16/2455*  (2019.01)

(52) U.S. Cl.
CPC ........ *G06F 21/577* (2013.01); *G06F 16/2455* (2019.01); *G06N 20/00* (2019.01); *G06F 2221/033* (2013.01); *G06F 2221/034* (2013.01)

(58) Field of Classification Search
CPC .. G06F 21/552; G06F 21/577; G06F 16/2455; G06F 2221/033; G06F 2221/034; H04L 63/1433; H04L 63/1416; G06N 20/00
See application file for complete search history.

(56) References Cited

U.S. PATENT DOCUMENTS

| 9,432,394 B1 | 8/2016 | Lahiri et al. |
| 2010/0058475 A1 | 3/2010 | Thummalapenta et al. |
| 2012/0089868 A1 | 4/2012 | Meijer et al. |
| 2015/0339214 A1 | 11/2015 | Rozenman et al. |

OTHER PUBLICATIONS

French Preliminary Search Report dated May 4, 2017 in French Application 16 61298, filed on Nov. 21, 2016 (with English Translation of Categories of cited documents).
Alexandre Rebert, et al. "Optimizing Seed Selection for Fuzzing", Proceedings of the $23^{rd}$ USENIX Security Symposium, 2014, 16 pages.

*Primary Examiner* — Paul E Callahan
(74) *Attorney, Agent, or Firm* — Oblon, McClelland, Maier & Neustadt, L.L.P.

(57) ABSTRACT

A method and a system for detection of the vulnerability of an onboard device called the evaluation target, including a challenge generator to generate a current challenge message adapted to test the vulnerability of the evaluation target, a challenge injector to inject the current challenge message into the evaluation target, a measurement module to measure a leakage signal related to a reaction of the evaluation target to the injection of the current challenge message, through an auxiliary channel, a signal analyser to analyse the leakage signal and to produce a current profile representative of the current challenge message, and a score calculator to assign a current score to the current challenge message as a function of the current profile and to send the current score to the challenge generator that is adapted to regenerate a new challenge message based on the current score.

15 Claims, 3 Drawing Sheets

METHOD AND SYSTEM FOR DETECTING THE VULNERABILITY OF AN ONBOARD DEVICE

TECHNICAL DOMAIN

This invention relates to the field of detection of vulnerability of a device comprising software and more particularly the detection of security shortcomings in an onboard device.

STATE OF PRIOR ART

Detection of vulnerability of a device comprising software is very important to improve the security and behaviour of the device.

There are several techniques for detection of vulnerability and security shortcomings of application software and onboard devices. A distinction is made mainly between the audit of the source code, the model check by formal proof, the static check of the source code and the dynamic verification of the executed code.

The dynamic verification of the executed code comprises a "fuzz testing" technique that consists of using a tester to intensively inject fuzzy faults into a device to be evaluated (called the evaluation target). Fuzzy faults are semi-valid or deliberately malformed inputs to put the evaluation target into unexpected states and to cause usable errors.

This technique is widely used because it is easy to implement and in most cases it gives good results and does not require detailed knowledge of the target.

However, this "fuzz testing" technique can take a long time if a large quantity of fuzzy faults is uselessly injected due to a bad strategy for generating these random faults. Furthermore, the fuzz testing technique does not guarantee that the test coverage is complete. Some software zones can remain not covered if the test is badly adapted or badly configured.

This type of problem is solved using a fuzz testing technique with feedback-driven fuzzing that extracts measurements derived from the previous injections to guide new injections. The objective is specifically to give greater weight to injections that gave a good result as a grain for mutation in the following injections.

This technique is suitable when the tester is executed on the same processor as the target and often on the same operating system. In this case, interfaces and information exchanges between the tester, the target and various monitoring tools can be created, even in a block box in which the test tool(s) benefit from the proximity of the binary code. Remember that a black box test means that the access to the information is partial. In particular, system specifications are not known and the definition of the protocol and interface are limited to the user view. The source code is not known and only the binary code of the executed image is accessible and in some cases may be overwritten at the end of the tests. The operating system on which the target is executed is open, so that tracers that monitor the behaviour of the target can be instrumented.

Document US2010058475 reveals an example of a fuzz test guided by feedback-driven fuzzing in which sensitive code segments are dynamically instrumented after a static analysis to give a feedback value at the end of each execution. This document uses evolutionary techniques to search for inputs that maximise the feedback value among the possible inputs.

However, the fuzz testing technique with feedback-driven fuzzing according to prior art is not possible in a sealed box. Note that a sealed box test means that the operating system on which the target is executed is closed. The binary code is only known if the load and execution format is accessible from the outside and if this format is not encrypted. The image cannot be modified to insert monitoring resources. In particular, it is impossible to instrument tracers to monitor the behaviour of the target.

Fuzz testing techniques with feedback-driven fuzzing according to prior art are based on the essential principle that the executable binary code is accessible and that it can be instrumented and sometimes modified to aid the trace tool even if the test is in a black box.

Thus, in a physical cyber type onboard device, the program image is not accessible, it cannot be modified and the results of a tracer cannot be used. The subject herein is a sealed box in which techniques according to prior art cannot be used.

The purpose of this invention is to disclose a method and system for detecting the vulnerability of an onboard device overcoming the above-mentioned disadvantages, particularly by performing a sealed box evaluation test, while guaranteeing complete coverage of detection.

PRESENTATION OF THE INVENTION

This invention is defined by a system for detection of the vulnerability of an onboard device called the evaluation target, comprising:
- a challenge generator configured to generate a current challenge message adapted to test the vulnerability of said evaluation target,
- a challenge injector configured to inject said current challenge message into said evaluation target,
- a measurement module configured to measure a leakage signal related to a reaction of the evaluation target to said injection of the current challenge message, through an auxiliary channel,
- a signal analyser configured to analyse said leakage signal and to produce a current profile representative of said current challenge message, and
- a score calculator configured to assign a current score to the current challenge message as a function of the current profile and to send said current score to the challenge generator that is adapted to regenerate a new challenge message based on said current score.

Thus, the system collects physical measurements representative of the behaviour of the target in reaction to injection of the challenge message, from the target and through hidden channels. This can be used to estimate the relevance of stimuli (i.e. challenge messages injected into the target) in order to determine new higher performance stimuli in the evaluation of the vulnerability of the target. This detection system enables complete coverage of detection even if the target is of the sealed box type that offers no access to the executable code or to the program image and does not allow the use of tracers.

Advantageously, the challenge generator is adapted to generate the challenge message at random from a protocol descriptor or from preliminary learning, using a mutation technique.

This simply and robustly generates higher performance stimuli from previous stimulus mutation grains that had good scores.

Advantageously, the mutation technique is based on a genetic algorithm or on a non-uniform distribution function.

According to a first embodiment of a mutation technique, the genetic algorithm is configured to:
classify a set of challenge messages as a function of the scores of each,
take challenge messages among the best classified messages and combine them in pairs to generate resulting challenge messages with characteristics common to the two combined messages, and
modify the resulting challenge messages to form new challenge messages with optimum performances.

According to a first embodiment of a mutation technique, the non-uniform distribution function is adapted to:
use a distribution function with variable average and variance representative of the challenge messages, and
weight the average and variance of said distribution function as a function of the score to generate new challenge messages.

Advantageously, the challenge injector is adapted to transform said challenge message before it is injected into a frame adapted to be sent on a physical channel of said evaluation target.

Advantageously, the measurement module is configured to sample the leakage signal and to transmit the sampled leakage signal $S_e$ to the signal analyser.

Advantageously, the signal analyser is configured to:
receive the sampled leakage signal $S_e$ from the measurement module,
filter said sampled leakage signal $S_e$ forming a filtered signal $S_f$,
undersample said filtered signal $S_f$ thus forming an undersampled signal $S_d$,
synchronise said undersampled signal $S_d$, thus forming a synchronised signal $S_t$ corresponding to the current profile, and,
use an equivalence search to construct a comparison table $T_c$ between the current profile and reference profiles stored in a profiles database, for example using probabilistic algorithms of the type using a cross correlation coefficient calculation or statistical algorithms of the type using a distribution function equivalence test.

Advantageously, the signal analyser is configured to store the current profile in the profiles database if said current profile is new. This is done after a probabilistic analysis and then a statistical analysis of the current profile relative to all previous known profiles.

Advantageously, the score calculator is configured to assign a current score to the current challenge message by extracting an occurrence frequency of the current profile from an occurrence histogram, this score being inversely proportional to the number of occurrences.

Advantageously, the leakage signal is a signal selected from among the following signals: electrical current consumption signal, electromagnetic signal, response time signal and error code signal.

The onboard device according to this invention is a connected object comprising software.

The invention also aims at a method of detecting the vulnerability of an onboard device called the evaluation target, comprising the following steps:
generate a current challenge message adapted to test the vulnerability of said evaluation target,
inject said current challenge message into said evaluation target,
measure a leakage signal related to a reaction of the evaluation target to said injection of the current challenge message, through an auxiliary channel,
analyse said leakage signal and produce a current profile representative of said current challenge message, and
assign a current score to the current challenge message as a function of the current profile and send said current score to the challenge generator that is adapted to regenerate a new challenge message based on said current score.

DETAILED PRESENTATION OF PARTICULAR EMBODIMENTS

The principle of the invention is to use a fuzz testing technique to evaluate the vulnerability of a target that can be of the sealed box type and access the target through hidden physical channels to estimate a feedback useful for the fuzz test.

Figure 1:
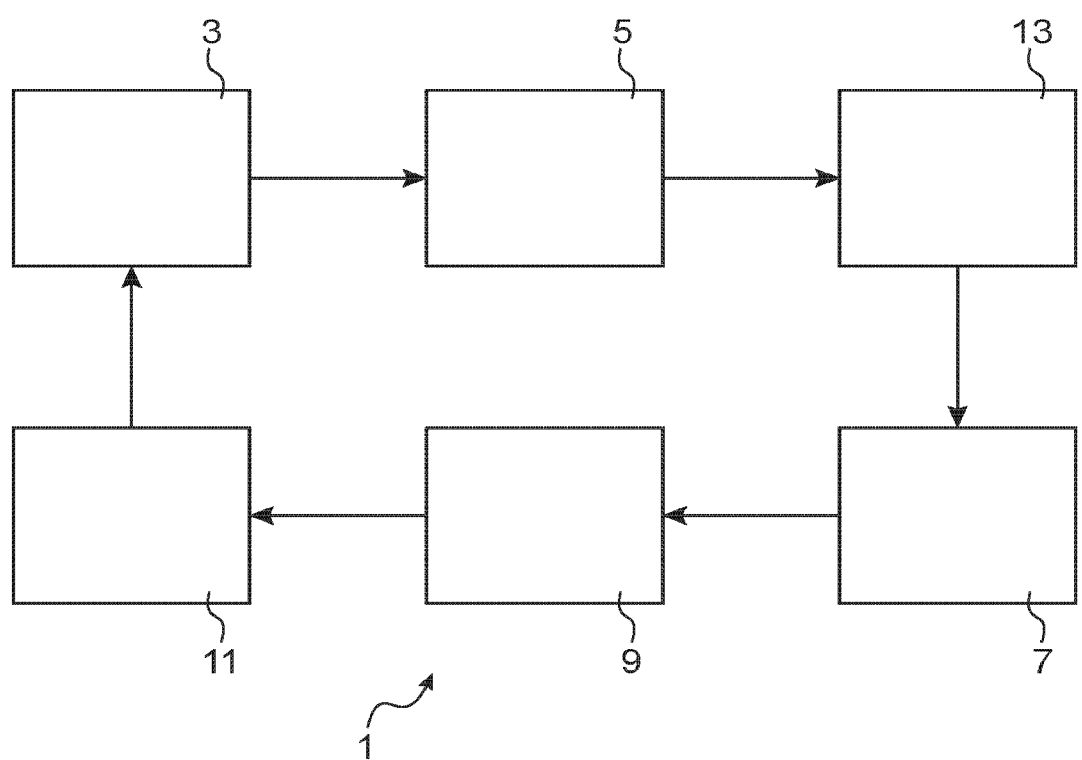
FIG. 1 diagrammatically illustrates a system to detect the vulnerability of an onboard device according to one embodiment of the invention FIG. 2 diagrammatically illustrates a method and a system to detect the vulnerability of an evaluation target according to one preferred embodiment of the invention, and FIG. 3 diagrammatically illustrates the measurement of a current consumption leakage signal according to one embodiment of the invention

FIG. 1 diagrammatically illustrates a system to detect the vulnerability of an onboard device according to one embodiment of the invention An onboard device is a device comprising a standalone software with limited resources for example such as a connected sensor or a connected object such as a connected watch. It will be noted that the onboard device does not comprise an operating system and may contain only very few branches. Throughout the following, the onboard device under test is called the evaluation target.

The detection system 1 is a structure assembling a chain of modules comprising a challenge generator 3, a challenge injector 5, a measurement module 7, a signal analyser 9 and a score calculator 11. The different modules together with the evaluation target 13 form a complete loop composed of a challenge injection system and a feedback system.

The challenge generator 3 is an algorithmic module configured to generate "adapted challenge" messages to test the vulnerability of the evaluation target 13.

More particularly, the challenge generator 3 is adapted to randomly generate practically valid or malformed messages either from a protocol descriptor or from learning initiated in a preliminary phase. The challenge generator 3 uses the indicated mutators and fuzzy distributions indicated in general by a fuzzing test manifest.

The challenge injector 5 (or fuzzing engine) acts as a bridge between the challenge generator 3 and the evaluation target. It is thus configured to inject challenge messages generated by the challenge generator 3 into the evaluation target 13. Advantageously, the challenge injector 5 transforms each challenge message before it is injected into a frame adapted to be sent on a wired or unwired physical channel of the evaluation target 13.

In receiving a challenge message, the target 13 reacts as a function of its robustness and the nature of the challenge message. Thus, the relevance of the challenge message can be determined by analysing the behaviour of the evaluation target.

The measurement module 7 is configured to measure leakage signals related to reactions of the evaluation target 13 to injections of challenge message, through a hidden or auxiliary channel. For example, leakage signals can be electrical current consumption signals, electromagnetic signals, temporal response signals or error code signals.

The signal analyser 9 is configured to analyse leakage signals measured by the measurement module 7. This analysis produces a profile representative of the corresponding challenge message and recognises each new profile, for each leakage signal.

The score calculator 11 is configured to assign scores to challenge messages as a function of the corresponding profiles and to send these scores to the challenge generator 3. The challenge generator is designed to regenerate new challenge messages based on scores received from the calculator 11.

It will be noted that operations done by the detection system 1 are used by a computer type of processing system.

Figure 2:
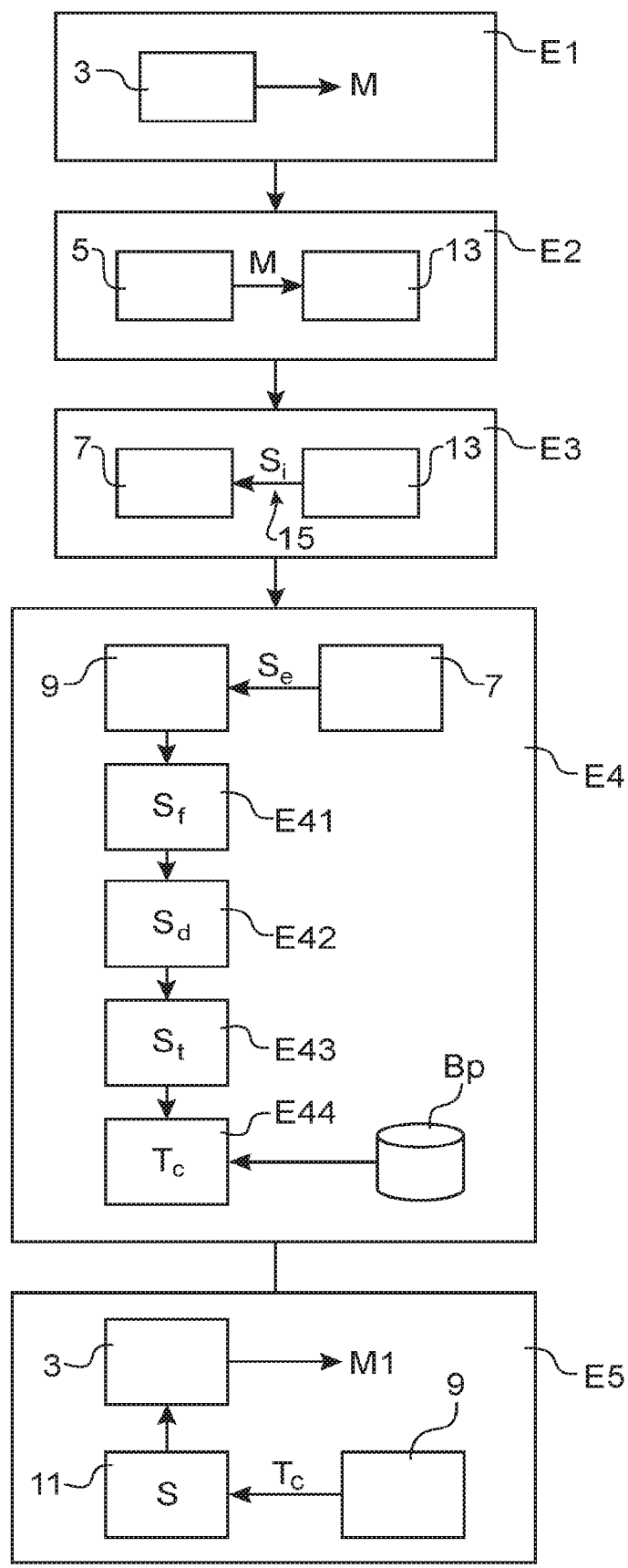

FIG. 2 diagrammatically illustrates a method and system to detect the vulnerability of an evaluation target according to one preferred embodiment of the invention.

In step E1, the challenge generator randomly generates a current challenge message M adapted to test the vulnerability of the evaluation target 13. According to a first example, the current challenge message M is generated in a known manner from a protocol descriptor. According to a second example, the current challenge message M is generated from leaning by experience initiated in a preliminary phase. The challenge generator also advantageously use a mutation technique to generate the challenge message M. This mutation technique can be based on a genetic algorithm or on a non-uniform distribution function.

The genetic algorithm is an iterative method generally comprising four phases on a group of N individuals (i.e. N challenge messages) for a population or generation. After a number of iterations, the population converges towards the best error search performance.

The first phase is an evaluation cycle in which the challenge generator 3 generates challenge messages and in which the challenge injector 5 injects these challenges one by one into the evaluation target 13. The response of the target 13 is detected by the measurement module 7 and is analysed by the signal analyser 9 before the calculator assigns a score to it. A good score means that the response can be helpful to detect an error, and on the other hand a bad score means that the response is of no use.

The second phase is a selection phase in which the challenge generator 3 classifies alert messages (i.e. individuals) as a function of the scores of each. They are assigned a probability of being selected in the next generation as a function of their score and the probability of selecting the best individual.

The third phase is a combination step in which selected challenge messages are combined in pairs to generate resulting challenge messages with characteristics common to the combined messages. Two initial challenge messages that intersect lead to the birth of two new individuals with characteristics common to the two parents (i.e. initial messages).

The fourth phase is a mutation phase in which the resulting challenge messages are modified to form new challenge messages that potentially have improved or optimal performances. For example, the modification consists of randomly changing an extremely low percentage (of the order of 0.1% to 1%) of the number of bits in the message chain.

As a variant, the mutation technique based on a non-uniform distribution function uses a function (for example the Von-Mises distribution) with variable average and variance representative of challenge messages. The average and the variance of the distribution function are weighted as a function of the score to generate new challenge messages. As the score increases, the average becomes better centred on winning challenge messages and the variance is low. On the other hand, as the score reduces, the variance becomes higher and the average moves towards the central value. Thus, when a random draw of a challenge message does not give a good score, the distribution field will be widened. On the other hand, when the draw does give a good score, the distribution is narrowed around the winning value.

In step E2, the challenge injector 5 remains connected to the evaluation target 13 and its purpose is to send challenge messages to this evaluation target. The challenge injector 13 transforms the current challenge message M supplied by the challenge generator 3 into a frame that can be sent on the physical channel (for example USB, Bluetooth, wifi, CAN, etc.) of the target 13.

On receiving the current challenge message M, the target 13 reacts as a function of the value of this input. In general, three main cases can arise.

In the first case, the challenge message M is genuinely erroneous and the target 13 detects and manages this error appropriately. In this case, the challenge is rejected because the target 13 reacts very little.

In the second case, the challenge message is valid and does not provoke an error. In this case, the target 13 can have an important but predictable and repetitive reaction.

In the third case, the challenge message M is erroneous but causes an error on the target 13 that had not envisaged this malformation. In this case, the target 13 will have an abnormal, specific and detectable reaction.

In step E3, the measurement module 7 makes a measurement of a leakage signal $S_i$ related to the reaction of the evaluation target 13, through an auxiliary channel 15. For example, the leakage signal $S_i$ may be a current consumption signal or an electromagnetic radiation signal.

Figure 3:
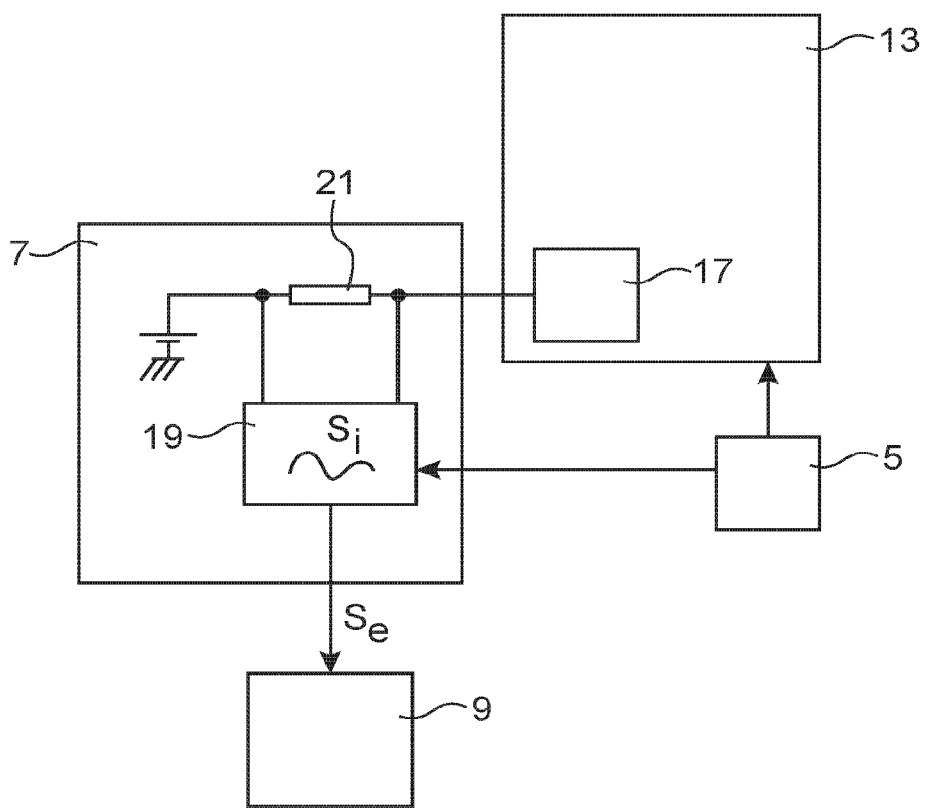

FIG. 3 diagrammatically illustrates the measurement of a current consumption leakage signal according to one embodiment of the invention Advantageously, the measurement module 7 makes the measurement inside the onboard equipment (the target) 13 or otherwise at the input to the power supply circuit 17 of the equipment 13. According to this example, the measurement module 7 comprises a digital oscilloscope 19 and a resistance with a very low value (for example of the order of 10 Ohms). The resistance 21 is put in series with the power supply circuit 17 of the target 13 and the voltage at the terminals of this resistance 21 is measured by the oscilloscope 19 using two probes Va and Vb. Advantageously, the oscilloscope 19 has good performance (for example 200 MHz of passband and 1 Giga samples per second) so that as much information as possible can be extracted, especially as a function of the frequency of the processor of the evaluation target 13.

The oscilloscope 19 is configured to receive a logical signal (0 or 1) triggering sampling of the voltage Vb-Va, from the challenge injector 5.

The oscilloscope 19 starts sampling when the injector 5 has finished sending the challenge frame to the target 13, in other words at the instant at which the evaluation target 13 starts to process it. If the evaluation target 13 systematically outputs a response (verbose target), the measurement acquisition is terminated when the target 13 terminates sending its response. If the target 13 rarely responds (not very verbose target), two solutions can be envisaged.

The first solution consists of making an assumption about the maximum reaction time of the target 13 and stopping acquisition of measurements when this time has elapsed. If the assumption is good, the duration of all responses will be shorter than the maximum time but the system 1 will function correctly. On the other hand, if the maximum time assumption is bad, the oscilloscope 19 will not have received all information because acquisition of the leakage signal $S_i$ stopped too early and the detection system 1 cannot function. In this case, the maximum time is increased and the measurement acquisition is started again.

The second solution consists of signalling the end of each response to the signal analyser 9.

Finally, and regardless of which option is chosen, the measurement module 7 is configured to sample the leakage signal $S_i$ and to transmit the sampled leakage signal $S_e$ to the signal analyser 9. It will be noted that if the leakage signal $S_i$ cannot be used because there is too much noise, several identical responses can be averaged (for example about ten to a few tens of responses) to attenuate noise.

Furthermore, in step E4, the signal analyser 9 receives the sampled leakage signal $S_e$ from the measurement module 5 and analyses this signal.

More particularly, in step E41, the signal analyser 9 filters the sampled leakage signal $S_e$. The first analysis operation consists of filtering high frequencies above the processor frequency because the leakage information being searched for cannot be in the high frequency range. Thus, a filtered signal $S_f$ is formed according to the following expression:

$$S_f = \text{lowpass\_filter}(F_p, S_e)$$

where $F_p$ represents the processor frequency.

In step E42, the signal analyser 9 undersamples the filtered signal $S_f$ so that there is no need to manipulate too many samples by processing the filtered signal Sf by an interpolation filter with a normalised frequency $F_n$. Thus, an undersampled signal $S_d$ is formed according to the following expression:

$$S_d = \text{interpolation\_filter}(F_n, S_f)$$

In step E43, the signal analyser 9 synchronises the undersampled signal $S_d$ by eliminating (by truncation) reference sequences Sb and Se at the limits of the undersampled signal $S_d$. Thus, a synchronised signal $S_t$ corresponding to the current profile is formed according to the following expression:

$$S_t = S_d[Nb, Ne] = \text{truncate}(S_d, S_b, S_e)$$

where Nb and Ne are the start and end ranks.

In step E44, the signal analyser constructs a comparison table $T_c$ between the current profile St and reference profiles Pn stored in a profiles database Bp, using an equivalence search (with maximum probability).

There are several known techniques for searching for equivalence in a database, for example such as the main components analysis technique, the deep-learning technique, and many others. The chosen technique will depend on the nature of the target 13 and the complexity of the onboard software.

A first example concerns the case of a target 13 with simple software that does not have an operating system OS, and is of the monothread execution type and has very few branches. In this case, the signal analyser 9 can be configured to use a simple comparison by a minimisation calculation.

Thus, for each profile Pn in the profiles database Bp, the signal analyser 9 calculates a distance Pd between the current profile St and the reference profiles Pn as follows:

$$Pd[n] = \text{sum}_i((Pn[i] - St[i])^2)/L,$$

where L is the length of the samples tables (i.e. the number of samples).

The signal analyser 9 then stores the values Pd[n] in a comparison table $T_c$ that will then be sent to the score calculator 11.

A second example concerns the case of a target 13 with a medium complex software without an operating system OS, that is of the single-task type but that may comprise multiple and nested branches, and that has good synchronisation. In this case, the signal analyser 9 can be configured to use a technique for calculation of correlation coefficients between the current profile $S_t$ and the reference profiles Pn contained in the profiles databases Bp. Correlation coefficients can be calculated using a Pearson type correlator Cp, as follows:

$$Cp[n] = \text{pearson\_correlator}(Pn, St)$$

The signal analyser 9 then stores the values Cp[n] in a comparison table $T_c$ that will be sent later to the score calculator.

A third example relates to the use of a target with complex software comprising an advanced linux type operating system OS, of the multitask type and comprising multiple branches. In this case, the signal analyser 9 can be configured to construct a cross-correlation matrix Cc and to determine the probability of equivalence by calculating the average of the coefficients using the following expression:

$$Cc[n,k] = \text{cross\_correlation}(k, Pn, St)$$

The signal analyser 9 then calculates the variance of these cross-correlation sequences to determine a probability of repetition of equivalence (number of correlation peaks) using the following expression:

$$VAR[n] = \text{variance}_k(Cc[n,k])$$

If the variance calculation is not sufficient to discriminate the current profile from stored profiles, it would be possible to use an estimate of the distribution function equivalence (for example a Kolmogorov-Smirnov test) between the current profile and known profiles that gave the best correlations.

The signal analyser 9 then stores the values VAR[n] in a comparison table $T_c$. Each value is referenced by a profile index.

Thus, the comparisons table Tc can contain either Pd[n] values, or Cp[n] values, or VAR[n] values depending on the choice of the equivalence detection technique used.

Advantageously, the signal analyser 9 is also configured to store the current profile $S_t$ in the profiles database $B_p$ if the current profile is new. This enriches the profiles database.

In step E5, the score calculator 11 receives the index of the profile recognised in the comparison table from the signal analyser 9 and assigns a current score S to the current challenge message M. The calculator 11 is configured to maintain an occurrences histogram containing the number of detections (output by the analyser) for each known profile. The score S is assigned by extracting the occurrence frequency of the current profile $S_t$ (i.e. the number of times that the current profile was recognised in the profiles database $B_p$), from the occurrence histogram. The value of the score S is then inversely proportional to the number of occurrences.

For example, to achieve this, the score calculator 11 can use a cumulative probability technique, knowing the maximum comparison occurrence Cmax ever recorded and cumulated over time. This, for each coordinate in the comparison table Tc, the score calculator calculates the score S[n] using the following expression:

$$S[n]=(Tc[n]-\min(Tc))/(C\max-\min(Tc)) \text{ if } Tc[n]<C\max$$

$$S[n]=1 \text{ otherwise (best score exceeded).}$$

The score calculator 11 then sends the current score S to the challenge generator 3 that is adapted to regenerate a new challenge message M1 based on the current score obtained in step E1.

The invention claimed is:

1. A system for detection of a vulnerability of an onboard device, called an evaluation target, comprising:
   a challenge generator comprising logic configured to generate a current challenge message adapted to test the vulnerability of said evaluation target,
   a challenge injector comprising logic configured to inject said current challenge message into said evaluation target,
   a measurement module comprising logic configured to measure a leakage signal* related to a reaction of the evaluation target to said injection of the current challenge message, through an auxiliary channel,
   a signal analyser comprising logic configured to analyse said leakage signal and to produce a current profile representative of said current challenge message, and
   a score calculator comprising logic configured to assign a current score to the current challenge message as a function of the current profile and to send said current score to the challenge generator comprising logic that is adapted to regenerate a new challenge message based on said current score.

2. The system according to claim 1, wherein the challenge generator is adapted to generate the challenge message at random from a protocol descriptor or from preliminary learning, using a mutation technique.

3. The system according to claim 2, wherein the mutation technique is based on a genetic algorithm or on a non-uniform distribution function.

4. The system according to claim 3, wherein the genetic algorithm is configured to:
   classify a set of challenge messages as a function of the scores of each,
   take challenge messages among the best classified messages and combine them in pairs to generate resulting challenge messages with characteristics common to the two combined messages, and
   modify the resulting challenge messages to form new challenge messages with optimum performances.

5. The system according to claim 3, wherein the non-uniform distribution function is configured to:
   use a distribution function with variable average and variance representative of the challenge messages, and
   weight the average and variance of said distribution function as a function of the score to generate new challenge messages.

6. The system according to claim 1, wherein the challenge injector is adapted to transform said challenge message before it is injected into a frame adapted to be sent on a physical channel of said evaluation target.

7. The system according to claim 1, wherein the measurement module is configured to sample the leakage signal and to transmit the sampled leakage signal to the signal analyser.

8. The system according to claim 7, wherein the signal analyser is configured to:
   receive the sampled leakage signal ($S_e$) from the measurement module,
   filter said sampled leakage signal ($S_e$) forming a filtered signal ($S_f$),
   undersample said filtered signal ($S_f$) thus forming an undersampled signal ($S_d$),
   synchronise said undersampled signal ($S_d$), thus forming a synchronised signal ($S_t$) corresponding to the current profile, and,
   construct a comparison table ($T_c$) between the current profile and reference profiles stored in a profiles database Bp, using an equivalence search.

9. The system according to claim 7, wherein the signal analyser is configured to store the current profile in the profiles database if said current profile is new.

10. The system according to claim 9, wherein the score calculator is configured to assign a current score to the current challenge message by extracting an occurrence frequency of the current profile from an occurrence histogram.

11. The system according to claim 1, wherein the leakage signal is a signal selected from among the following signals: electrical current consumption signal, electromagnetic signal, response time signal and error code signal.

12. The system according to claim 1, wherein the onboard device is a connected object comprising software.

13. A method for detection of the vulnerability of an onboard device, called an evaluation target, comprising the following steps:
   generating a current challenge message adapted to test the vulnerability of said evaluation target,
   injecting said current challenge message into said evaluation target,
   measuring a leakage signal, related to a reaction of the evaluation target to said injection of the current challenge message, through an auxiliary channel,
   analyzing said leakage signal and producing a current profile representative of said current challenge message,
   assigning a current score to the current challenge message as a function of the current profile; and
   generating a new challenge message based on said current score.

14. A method for detection of a vulnerability of an onboard device, called an evaluation target, comprising the following steps:
   generating a current challenge message adapted to test the vulnerability of said evaluation target,
   injecting said current challenge message into said evaluation target,
   measuring a leakage signal, related to a reaction of the evaluation target to said injection of the current challenge message, through an auxiliary channel,
   analyzing said leakage signal and producing a current profile representative of said current challenge message,
   assigning a current score to the current challenge message as a function of the current profile; and
   generating a new challenge message based on said current score, wherein generating a current challenge message comprises generating the current challenge message at random from a protocol descriptor or from preliminary learning, using a mutation technique, wherein the mutation technique is based on a genetic algorithm or on a non-uniform distribution function, wherein the genetic algorithm comprises the steps of:

classifying a set of challenge messages as a function of the scores of each, taking challenge messages having best scores from among the set of classified messages and combining them in pairs to generate resulting challenge messages with characteristics common to the two combined messages, and modifying the resulting challenge messages to form new challenge messages with optimum performances.

15. A method for detection of a vulnerability of an onboard device, called an evaluation target, comprising the following steps:

generating a current challenge message adapted to test the vulnerability of said evaluation target, injecting said current challenge message into said evaluation target, sampling a leakage signal, related to a reaction of the evaluation target to said injection of the current challenge message, through an auxiliary channel, analyzing said leakage signal and producing a current profile representative of said current challenge message, assigning a current score to the current challenge message as a function of the current profile; and generating a new challenge message based on said current score, wherein analyzing said leakage signal comprises:

receiving the sampled leakage signal ($S_e$), filtering said sampled leakage signal ($S_e$) to form a filtered signal ($S_f$), undersampling said filtered signal ($S_f$) to form an undersampled signal ($S_d$), synchronizing said undersampled signal ($S_d$) to form a synchronized signal ($S_t$) corresponding to the current profile, and, constructing a comparison table ($T_c$) between the current profile and reference profiles stored in a profiles database Bp, using an equivalence search.

* * * * *